May 4, 1948.  F. ROTTIER  2,441,083
ARTICLE IMPALING CONVEYOR
Filed April 27, 1946
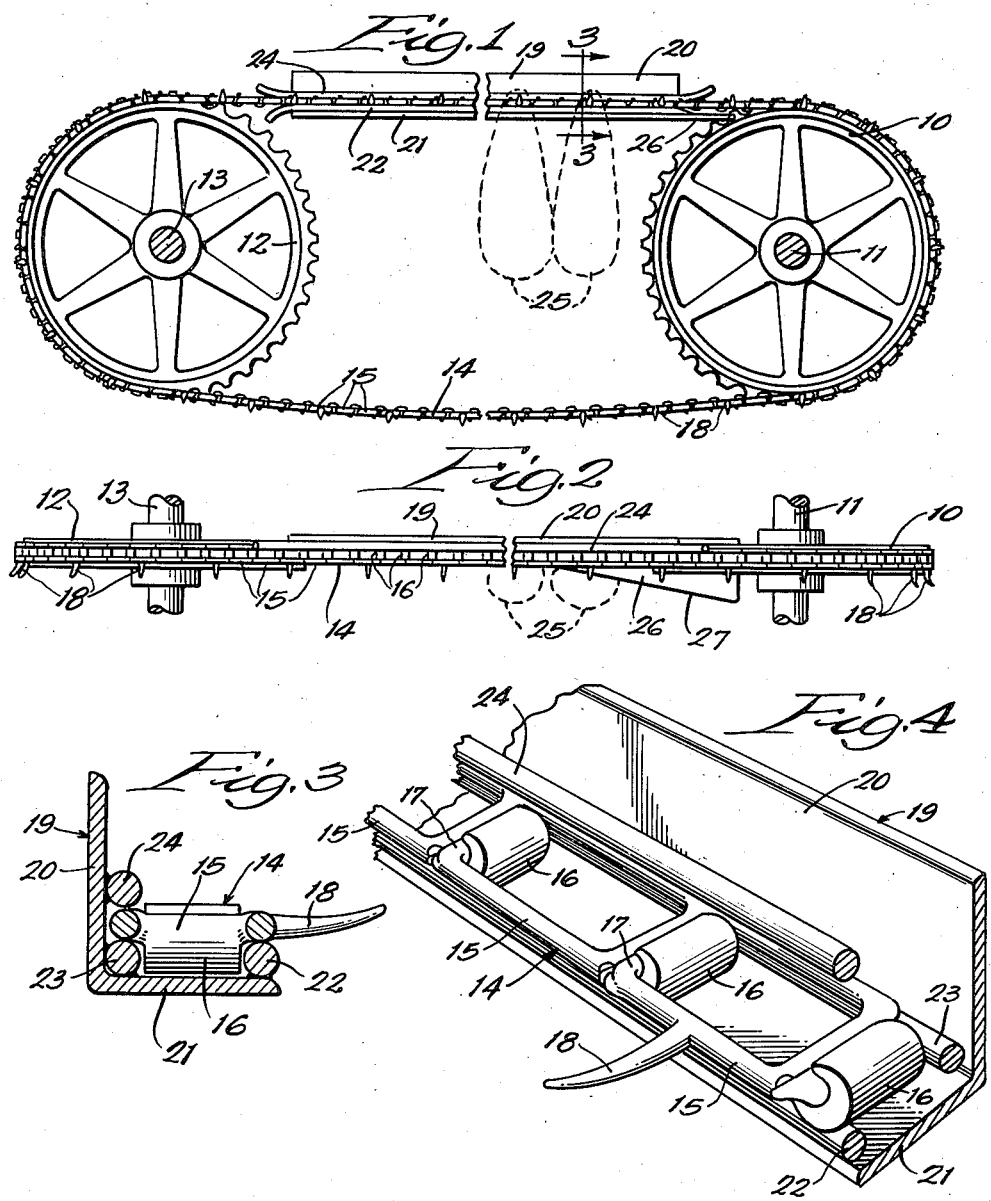

Patented May 4, 1948

2,441,083

UNITED STATES PATENT OFFICE 2,441,083

ARTICLE IMPALING CONVEYOR

Frank Rottier, Lansing, Ill., assignor to Piowaty-Bergart Company, Chicago, Ill., a corporation of Illinois Application April 27, 1946, Serial No. 665,533

3 Claims. (Cl. 198—178)

This invention relates to conveyor apparatus and more particularly to apparatus designed to carry packages or materials which may be readily attached to and removed from the conveyor.

An object of the invention is to provide conveyor apparatus of simple and sturdy construction equipped with means for supporting containers and objects in such a manner as to permit their quick application to the conveyor and release therefrom. A further object is to provide conveyor mechanism to which containers or packages or objects may be applied and later automatically removed therefrom. Yet another object is to provide a conveyor structure wherein laterally extending members are afforded to receive sacks, containers or articles together with means for supporting the conveyor to prevent tilting thereof under the weight of such containers and objects, etc. A further object is to provide a conveyor structure with laterally extending prongs adapted to be inserted through sacks, or supporting portions of objects so that they may be transported to a desired destination, means being provided at the destination for automatically removing the sacks, etc. Other specific objects and advantages will appear as the specification proceeds.

The invention is illustrated, in a preferred embodiment, by the accompanying drawing, in which—

Figure 1 is a broken side view in elevation of apparatus embodying my invention; Fig. 2, a plan view of the structure shown in Fig. 1; Fig. 3, an enlarged sectional detail view, the section being taken as indicated at line 3 of Fig. 1; and, Fig. 4, a broken perspective view of the conveyor track, conveyor chain, and the means for supporting the chain against tilting.

In the illustration given, 10 designates a sprocket wheel mounted upon drive shaft 11. A second sprocket wheel 12 is carried upon an idler shaft 13. Sprockets 10 and 12 are connected by a conveyor chain 14.

The conveyor chain 14 is formed of separable links 15, each link having at its forward end a socket member 16 receiving the round 17 of the link ahead. The socket portion 16 is preferably narrower in width than the main body of the link, as indicated more clearly in Fig. 3. At spaced intervals, one of the links 15 is provided with an integral outwardly extending prong or hook 18.

A track 19 is provided for supporting the link conveyor 14 through at least a portion of its travel, as indicated more clearly in Fig. 1. The track is formed of an angle-iron member providing a vertical side wall 20 and a horizontal track wall 21. Mounted upon the horizontal track wall are the longitudinally extending rods 22 and 23. The track rods 22 and 23 are spaced apart so as to provide a track receiving the body portion of the links 15, as indicated more clearly in Fig. 3. The socket member 16 of each link extends downwardly between the track rods 22 and 23 and then upwardly as indicated more clearly in Fig. 4.

In order to prevent the link 15 from tilting when a weight is placed upon the prong 18, I provide a guide rod 24, which may be secured by welding or other means to the vertical wall 20 of track 19. The guide rod 24 is supported just above the side of the link opposite prong 18 and prevents the tilting of link 15. The rod 24 may be formed of brass or any other suitable material and the rods 22 and 23 may be likewise formed. Similarly, the links 15 may be formed of steel or of any other suitable metal.

The prong 18 may be attached to or formed integrally with the link 15 and it is illustrated as having a slight upward inclination so as to retain the bag or other device applied thereto. It will be understood that the shape and character of the supporting arm 18 may be varied widely depending upon the type of product to be carried thereby.

It will be understood that the conveyor 14 may be of any desired length and the track 19 may also extend for substantial distances. As illustrated more clearly in Fig. 1, a network bag 25, after filling with tangerines, potatoes, onions or other produce or objects may be readily applied to the prong 18 so that the prong serves as a means for closing the top of the container while also supporting it upon the conveyor 14. When the bag has reached its desired destination, I prefer to provide simple means for removing it from the prong 18 and deposit it in a receptacle or platform, etc. In the illustration given, an inclined plate 26, having an outwardly inclined side 27, engages the bag 25 as the conveyor chain moves forwardly toward sprocket 10 and thus frees the bag from the prong 18. If desired, a positive member, actuated by cams on the sprocket wheel 10, may be employed for pushing the bag 25 outwardly at a desired point to free it from the prong 18. It will be understood that any mechanical structure suitable for pushing the bag outwardly and off the prong 18 may be employed at the place of destination of the bag.

It will further be understood that after the bag is placed upon the hook or prong 18 and is carried along the track, that any suitable mechanism, such as a sewing machine mechanism or other sealing means may be employed to seal the bag 25 or sew it into closed condition before it is ejected at the point of destination.

Instead of employing woven or network bags 25 for carrying produce, etc., it will be understood that articles themselves having handles, rings or hook-like projections will permit them to be directly suspended upon the members 18 and further, the character of the member 18 may be modified in shape and arrangement so as to support other desired objects or containers. Instead of equipping one of the links 15 here and there with a prong 18, each link may carry a laterally extending support or several such supports in spaced relation.

Operation

In the operation of the device, network bags 25 containing produce are applied by an operator to the prong 18 so that the prong 18 closes the upper end of the bag and enables it to be carried forwardly. The stabilizing rod 24 prevents tilting of the link 15 under the weight of the bag and permits the bag to be carried readily along the track to its point of destination. As the bag reaches its point of destination, the inclined wall 27 gradually moves the bag 25 outwardly to the point where it slips off the end of prong 18 and comes to rest within a receptacle or platform or any other suitable receiving surface. Other objects than bags or containers, etc., will similarly be removed from the support arms 18 by any suitable mechanism for pushing the same outwardly and away from the arms 18.

While I have shown a stabilizing rod 24 as a means for preventing tilting of the link conveyor 14 when weight is placed upon the prongs 18, it will be understood that cooperating means may be provided between the conveyor itself and the track at other points to prevent such tilting. In the illustration given, the socket member 16 may be of assistance in preventing such tilting, by reason of its engagement with the track 23.

While in the foregoing specification, I have set forth certain details as illustrative of one mode of application of the invention, it will be understood that such details may be modified widely by those skilled in the art without departing from the spirit of my invention.

I claim:

1. Conveyor apparatus, comprising a track, a link conveyor mounted thereon, some of the links being provided with spur supports extending laterally therefrom and being curved downwardly along their central portion and upwardly to substantially pointed ends, and cooperating means on said conveyor and track for anchoring said link conveyor against tilting when bags are suspended upon said spur supports.

2. Conveyor apparatus adapted for the conveying of net containers, comprising a track, a link conveyor mounted thereon, at least some of the links being provided with laterally-extending spur supports having pointed ends, and cooperating means on said conveyor and track for anchoring said link conveyor against tilting when weight is placed upon said supports, the spur support being curved downwardly from the point of its attachment with the link to form a saddle portion in its center and then curving upwardly toward the pointed end thereof.

3. Conveyor apparatus, comprising a track equipped on one side with a rod running longitudinally of the track, and on the opposite side, with two rods spaced from each other and running longitudinally of the track, a link conveyor having lateral portions resting upon the rod on one side thereof and between said rods on the other side of the track, said portion of the conveyor above the single rod being equipped with laterally-extending spur supports, and means for moving said conveyor on said track, said spur supports being provided with a curved saddle portion at their center and with an upwardly tapered free end portion.

FRANK ROTTIER.

REFERENCES CITED

The following references are of record in the file of this patent:

UNITED STATES PATENTS

| Number | Name | Date |
| --- | --- | --- |
| 342,474 | Svenson | May 25, 1886 |
| 661,799 | Good | Nov. 13, 1900 |
| 1,545,114 | Alvey | July 7, 1925 |
| 2,103,680 | Klaucke | Dec. 28, 1937 |
| 2,251,121 | Daw | July 29, 1941 |